US008380209B1

(12) United States Patent  (10) Patent No.: US 8,380,209 B1
Sylvain  (45) Date of Patent: Feb. 19, 2013

(54) PROVIDING INFORMATION TO A CALLER BASED ON A CALLED MOBILE TERMINAL'S TEMPORARY DIRECTORY NUMBER

(75) Inventor: Dany Sylvain, Gatineau (CA)

(73) Assignee: Apple Inc., Cupertino, CA (US)

( * ) Notice: Subject to any disclaimer, the term of this patent is extended or adjusted under 35 U.S.C. 154(b) by 2071 days.

(21) Appl. No.: 10/826,591

(22) Filed: Apr. 16, 2004

(51) Int. Cl.
*H04W 40/00* (2009.01)
*H04M 3/42* (2006.01)
*H04M 11/10* (2006.01)

(52) U.S. Cl. ...... 455/445; 455/417; 455/413; 455/414.2
(58) Field of Classification Search .................. 455/417, 455/413, 414.2, 445
See application file for complete search history.

(56) References Cited

U.S. PATENT DOCUMENTS

| | | | | |
|---|---|---|---|---|
| 5,815,808 | A * | 9/1998 | Valentine | 455/422.1 |
| 5,933,784 | A | 8/1999 | Gallagher et al. | |
| 5,978,678 | A * | 11/1999 | Houde et al. | 455/433 |
| 6,011,975 | A * | 1/2000 | Emery et al. | 455/456.1 |
| 6,044,269 | A | 3/2000 | Talagery | |
| 6,097,966 | A | 8/2000 | Hanley | |
| 6,157,831 | A * | 12/2000 | Lamb | 455/433 |
| 6,185,198 | B1 * | 2/2001 | LaDue | 370/329 |
| 6,282,416 | B1 * | 8/2001 | Verdonk | 455/413 |
| 6,393,269 | B1 | 5/2002 | Hartmaier et al. | |
| 6,487,412 | B1 * | 11/2002 | Brennan et al. | 455/445 |
| 6,496,578 | B1 | 12/2002 | Chen et al. | |
| 6,532,490 | B1 * | 3/2003 | Lewis et al. | 709/217 |
| 6,580,907 | B2 | 6/2003 | Hughes et al. | |
| 6,647,259 | B1 | 11/2003 | Boyle et al. | |
| 6,741,695 | B1 * | 5/2004 | McConnell et al. | 379/229 |
| 6,757,538 | B1 * | 6/2004 | Howe | 455/445 |
| 6,996,396 | B1 | 2/2006 | Snapp | |
| 7,466,813 | B1 * | 12/2008 | Easley et al. | 379/210.01 |
| 2002/0168987 | A1 * | 11/2002 | Wang et al. | 455/456 |
| 2003/0059023 | A1 * | 3/2003 | Crockett et al. | 379/220.01 |
| 2003/0166403 | A1 | 9/2003 | Hammer et al. | |
| 2003/0224795 | A1 * | 12/2003 | Wilhoite et al. | 455/445 |
| 2005/0037750 | A1 * | 2/2005 | Goering et al. | 455/432.1 |
| 2005/0041787 | A1 | 2/2005 | Casey et al. | |
| 2005/0070282 | A1 * | 3/2005 | Hinz | 455/435.1 |
| 2005/0096006 | A1 | 5/2005 | Chen et al. | |
| 2005/0096056 | A1 * | 5/2005 | Klehn et al. | 455/445 |
| 2005/0148343 | A1 * | 7/2005 | Perlmutter | 455/456.3 |
| 2005/0185784 | A1 | 8/2005 | Chiu et al. | |
| 2005/0221793 | A1 * | 10/2005 | Chin et al. | 455/401 |

* cited by examiner

*Primary Examiner* — Christopher M Brandt
*Assistant Examiner* — Muthuswamy Manoharan
(74) *Attorney, Agent, or Firm* — Meyertons, Hood, Kivlin, Kowert & Goetzel, P.C.

(57) ABSTRACT

When a caller initiates a call to a mobile terminal that is served by visited switch, information is provided to the caller based on the temporary directory number assigned to the mobile terminal by the visited switch. The information provided to the caller may relate to the location of the mobile terminal, include call processing options for the caller, or a combination thereof. When call processing options are provided, the caller may select an option and have the call processed accordingly. For example, the call processing options may include being routed to voicemail, a third party, or the originally called party. Other criteria may be used to assist in selecting the information to provide to the caller, such as the identification of the caller, the time, date, or differences in time zones between the home and visited networks.

50 Claims, 9 Drawing Sheets

PROVIDING INFORMATION TO A CALLER BASED ON A CALLED MOBILE TERMINAL'S TEMPORARY DIRECTORY NUMBER

FIELD OF THE INVENTION

The present invention relates to mobile communications, and in particular to processing incoming calls intended for a mobile terminal based on a temporary directory number, which is assigned to the mobile terminal while it is roaming.

BACKGROUND OF THE INVENTION

With the extensive penetration of wireless communications, people may be contacted through their mobile terminals virtually anywhere and at any time. Given such communication freedom, wireless users may want to control or otherwise restrict the calls they receive, especially when traveling, for both economy and convenience. Although the wireless users may use caller identification to screen calls, the caller identification information may not be available. Further, the caller identification is not received unless the call is received, and thus, the wireless user will be disrupted upon receiving the incoming call. When traveling, wireless users may want to restrict when calls will be received, or if calls will be received. The wireless user may prefer to receive only business-related calls while on business trips, and only personal calls while on vacation. When traveling in different time zones, certain time limitations may be desirable for incoming calls based on sleep or work requirements. If calls are blocked or forwarded to voicemail, it would be beneficial to provide the caller with information indicating why the call was handled in such a manner. Based on such information, it would be further beneficial to provide the caller with options in light of the wireless user's situation or location. These options could include leaving a voicemail, continuing with the call, or being forwarded to another person or telephony device.

The wireless user may also want to avoid roaming or long distance charges for all or certain calls, depending on the wireless user's current location. Although techniques are available that allow wireless users to have their calls forwarded to other telephony terminals or to voicemail, the configuration requirements to implement forwarding are often manually intensive. As such, the wireless users often forget or do not bother to go through the extra effort to set up call forwarding.

In essence, the location of a wireless user often dictates the wireless user's desires for receiving incoming calls. As such, there is a need for a technique to allow wireless users to efficiently and effectively control how incoming calls are processed and ultimately routed based on the wireless user's location. There is a further need to provide such processing in an automated fashion, wherein the processing rules may automatically change based on the user's location, without requiring the wireless user to constantly reconfigure the processing rules when moving from one location to another. There is a further need to provide information indicating why the call is being processed as it is to the caller, as well as provide the caller with options on how to proceed in light of the wireless user's situation or location.

SUMMARY OF THE INVENTION

When a caller initiates a call to a mobile terminal that is roaming outside of a home network into a visited network, information is provided to the caller based on the temporary directory number assigned to the mobile terminal in the visited network. The information provided to the caller may relate to the location of the mobile terminal, include call processing options for the caller, or a combination thereof. When call processing options are provided, the caller may select an option and have the call processed accordingly. For example, the call processing options may include being routed to voicemail, a third party, or the originally called party. Other criteria may be used to assist in selecting the information to provide to the caller, such as the identification of the caller, the time, date, or differences in time zones between the home and visited networks.

The selection of the information, including any call processing options, to provide to the caller may be based on a set of rules derived from a profile established by the originally called party who is associated with the mobile terminal. The profile may be configured to provide different information and call processing options for different calls, depending on any of the above factors, including different groups of people. The home and visited networks may be formed from circuit-switched or packet-based networks associated with wired or wireless communications.

When a call is initiated, the home network for the mobile terminal will determine that a call is being initiated to the roaming mobile terminal. The temporary directory number is obtained from the visited network in which the mobile terminal is roaming. The temporary directory number is then used to determine the information to provide to the caller.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention uses a temporary directory number (TDN), which is assigned to a mobile terminal when roaming, to determine how to process incoming calls directed to the mobile terminal. The TDN assigned to the mobile terminal may be indicative of the location of the mobile terminal, billing associated with calls to the mobile terminal, or a combination thereof. The user of the mobile terminal may establish a profile, which provides rules for processing the incoming calls based on the TDN or information associated therewith, alone or in combination with other criteria, such as time of day, the caller, time zone delays, and the like. Based on the TDN and the rules of the profile, call processing options are provided to the caller. The caller will select a call processing option, and the call will be processed accordingly. The call may be processed in a number of ways, including determining whether to route the call to the mobile terminal or to another telephone, determining not to continue with the call, or deciding to route the call to voicemail. Those skilled in the art will recognize other routing alternatives in light of the teachings herein.

Figure 1:
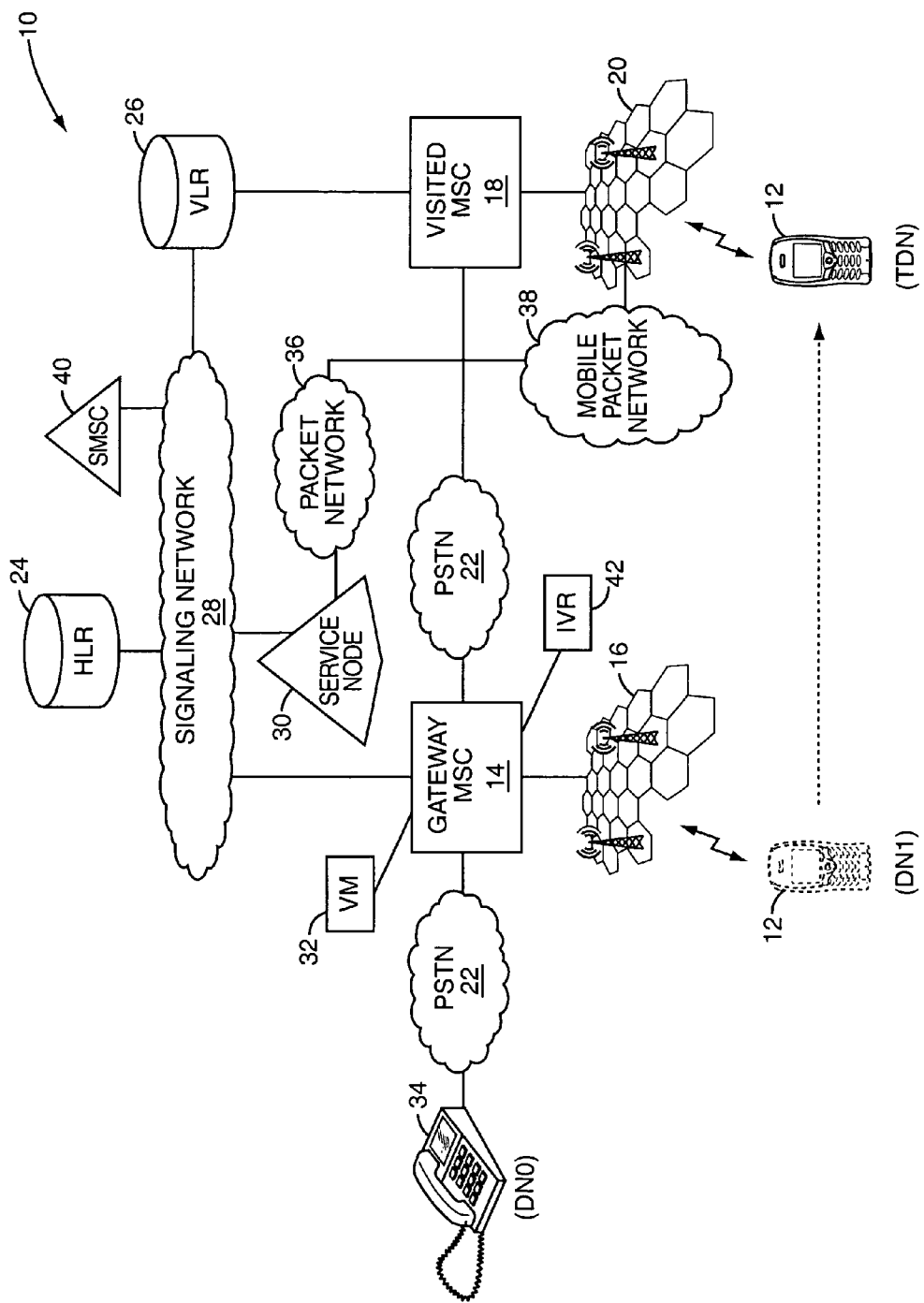
FIG. 1 is block representation of a communication environment according to a first embodiment of the present invention.

Prior to delving into further details regarding the present invention, an overview of a cellular communication environment 10 is described in FIG. 1 according to a first embodiment of the present invention. The cellular communication environment 10 supports cellular communications with a mobile terminal 12 using cellular communication techniques. In general, the mobile terminal 12 is associated with a gateway mobile switching center (MSC) 14, which acts as a home switch for the mobile terminal 12. Communications with the mobile terminal 12 through the gateway MSC 14 are provided through a first network of base stations 16, such that when the mobile terminal 12 is serviced by the first network of base stations 16, calls may be originated or received through the gateway MSC 14.

When the mobile terminal 12 is roaming outside of the coverage area afforded by the first network of base stations 16, and thus the service area for the gateway MSC 14, cellular communications with the mobile terminal 12 are facilitated through a visited MSC 18 and an associated second network of base stations 20. Incoming calls to the mobile terminal 12 will be received by the gateway MSC 14, which will forward the calls over a Public Switched Telephone Network (PSTN) 22 to the visited MSC 18. The visited MSC 18 will then cooperate with the second network of base stations 20 to establish calls with the mobile terminal 12. Notably, the mobile terminal 12 is associated with a primary directory number, which is referenced as DN1 herein. The primary directory number is also associated with the gateway MSC 14, such that calls intended for the primary directory number are sent to the gateway MSC 14. When the mobile terminal 12 is roaming, the gateway MSC 14 must retrieve a temporary directory number, which is temporarily assigned to the mobile terminal 12 when it is being serviced by the visited MSC 18.

To keep track of the mobile terminal 12 and orchestrate the assignment and distribution of the TDN for call routing, a home location register (HLR) 24 and a visited location register (VLR) 26 are provided. The HLR 24 is generally associated with the gateway MSC 14 and provides a database that contains semi-permanent mobile subscriber information for a given service provider. The HLR subscriber information includes identification information for the mobile terminal 12 or the subscriber, service subscription information outlining available services to which the subscriber is entitled, location information, service restrictions, and supplementary services information. The location information will generally include the identity of the currently servicing VLR 26, which is associated with the visited MSC 18. The HLR 24 will retrieve the TDN via the VLR 26.

The VLR 26 is associated with the visited MSC 18 and includes a database containing temporary information concerning the mobile terminals 12 that are currently located in the visited MSC's service area, but whose HLRs 24 are located elsewhere. Thus, when a mobile terminal 12 roams into the service area for the visited MSC 18, the visited MSC 18 and the VLR 26 will cooperate to create a temporary record for the mobile terminal 12. The record is generally stored in the VLR 26, and may include the TDN, which is generally dynamically assigned when the mobile terminal 12 receives or places a call within the service area of the visited MSC 18. When an incoming call intended for a roaming mobile terminal 12 is received at the gateway MSC 14, the gateway MSC 14 will access the HLR 24 to obtain the TDN for the mobile terminal 12. To provide the TDN for the mobile terminal 12, the HLR 24 will access the VLR 26. The HLR 24 will know which VLR 26 to access, because the VLR 26 will pass on the registration of the mobile terminal 12 to the HLR 24 when the mobile terminal 12 comes within the service area of the visited MSC 18. The VLR 16 may interact with the visited MSC 18 to assign the TDN for the mobile terminal 12. The HLR 24 and the VLR 26 may communicate over a signaling network 28, such as the Signaling Systems 7 (SS7) network, which also connects to the gateway MSC 14 and the visited MSC 18 and provides a mechanism through which call signaling is provided.

As noted above, call routing logic is provided in association with the gateway MSC 14 to determine how to process incoming calls intended for a roaming mobile terminal 12 based on the TDN. The call routing logic may be provided in a service node 30, which may be separate from or incorporated within the gateway MSC 14. For purposes of clarity in illustration, the service node 30 is provided herein as a separate entity. When a call intended for a roaming mobile terminal 12 is received, the gateway MSC 14 will access the HLR 24 to obtain the TDN and subsequently access the service node 30 for call processing instructions. In one embodiment, the call processing instructions from the service node 30 cause call processing related instructions to be provided to the caller. Based on the response to the instructions, the call will then be routed accordingly.

The TDN will be associated with a general location of the mobile terminal 12, and this location information will be used to determine the call processing options to provide to the caller. For example, the options may include selections to route the call to the mobile terminal 12, route the call to another telephone terminal, or route the call to voicemail. The options may vary based on the caller, time and/or date, time zone, or any other desirable criteria. In other embodiments, the call may be blocked, without providing options. Further, the options may be presented to the caller in a manner explaining why the options are being provided.

The TDN or location may also bear on the charges that will be applied to the subscriber for the mobile terminal 12, if the incoming call is routed to the mobile terminal 12. In addition to using the TDN as routing criteria, other criteria may be used in association with the TDN to provide a more sophisticated rule set for call processing and the selection of call processing options that are provide to the user. Thus, the location or billing information may be used in combination with other information, such as caller identification, time of day, date, time zone differences between those associated with the gateway MSC 14 and that of the visited MSC 18, and the like. Those skilled in the art will recognize numerous criteria for establishing processing rules and identifying call processing options to provide to the caller. A common set of processing rules and caller options may be applied to every incoming call, or different sets of call rules and options may be provided for different groups of callers, times, dates, and the like.

The cellular communication environment 10 may also include a voicemail (VM) system 32 associated with the gateway MSC 14. Also illustrated is a telephone terminal 34, which is connected to the PSTN 22 and is associated with a directory number DN0. The telephone terminal 34 is the entity from which calls to the mobile terminal 12 are initiated throughout the following description.

For packet-based communications, access to a packet network 36 may be provided via a mobile packet network 38, such as a General Packet Radio Service (GPRS) network, which is illustrated as being connected to the second network of based stations 20. In general, voice calls are routed to the visited MSC 18, wherein packet sessions are routed to the packet network 36 via the mobile packet network 38. Further, the service node 30 may be able to communicate over the packet network 36. Additionally, a short message service center (SMSC) 40 may be provided to facilitate a short message service (SMS) for the mobile terminal via the gateway MSC 14 or visited MSC 18. In one embodiment, information about the incoming call, caller, or the caller's call processing decisions may be sent to the mobile terminal 12 via a SMS message. The service node 30 may cooperate with the SMSC 40 to allow the user of the mobile terminal 12 to screen the incoming call. The screening is provided by allowing the user to review the call information and provide feedback to the service node 30 via a responsive SMS message to control how the call should be processed.

To facilitate interaction with the caller, an interactive voice response (IVR) system 42 is provided. The IVR system 42 will be able to provide announcements to the caller, which will include the selected call processing options, and receive a response selecting an option from the caller. Based on the response, the IVR 42 can provide instructions to the gateway MSC 14 on how to process the call. As will be described below, the service node 30, gateway MSC 14 and the IVR system 42 cooperate with one another to determine the options to provide to the caller, provide the options to the caller, receive the response from the caller, and process or route the call accordingly. Other systems in addition to IVR systems may be used to facilitate interaction with the caller as those skilled in the art will recognize.

Figure 2A:
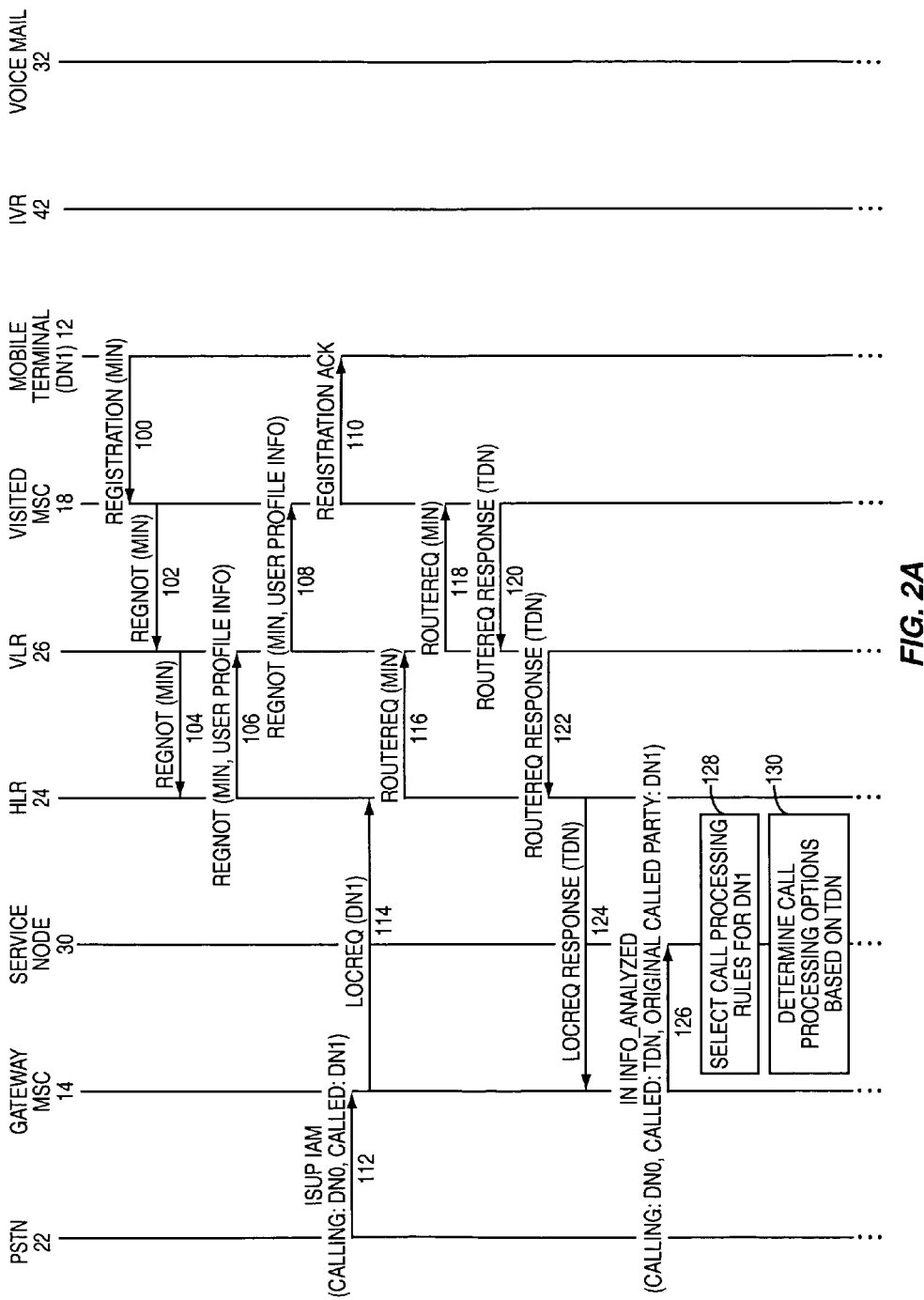
FIGS. 2A and 2B are a communication flow diagram illustrating the operation of the present invention according to the first embodiment.
Figure 2B:
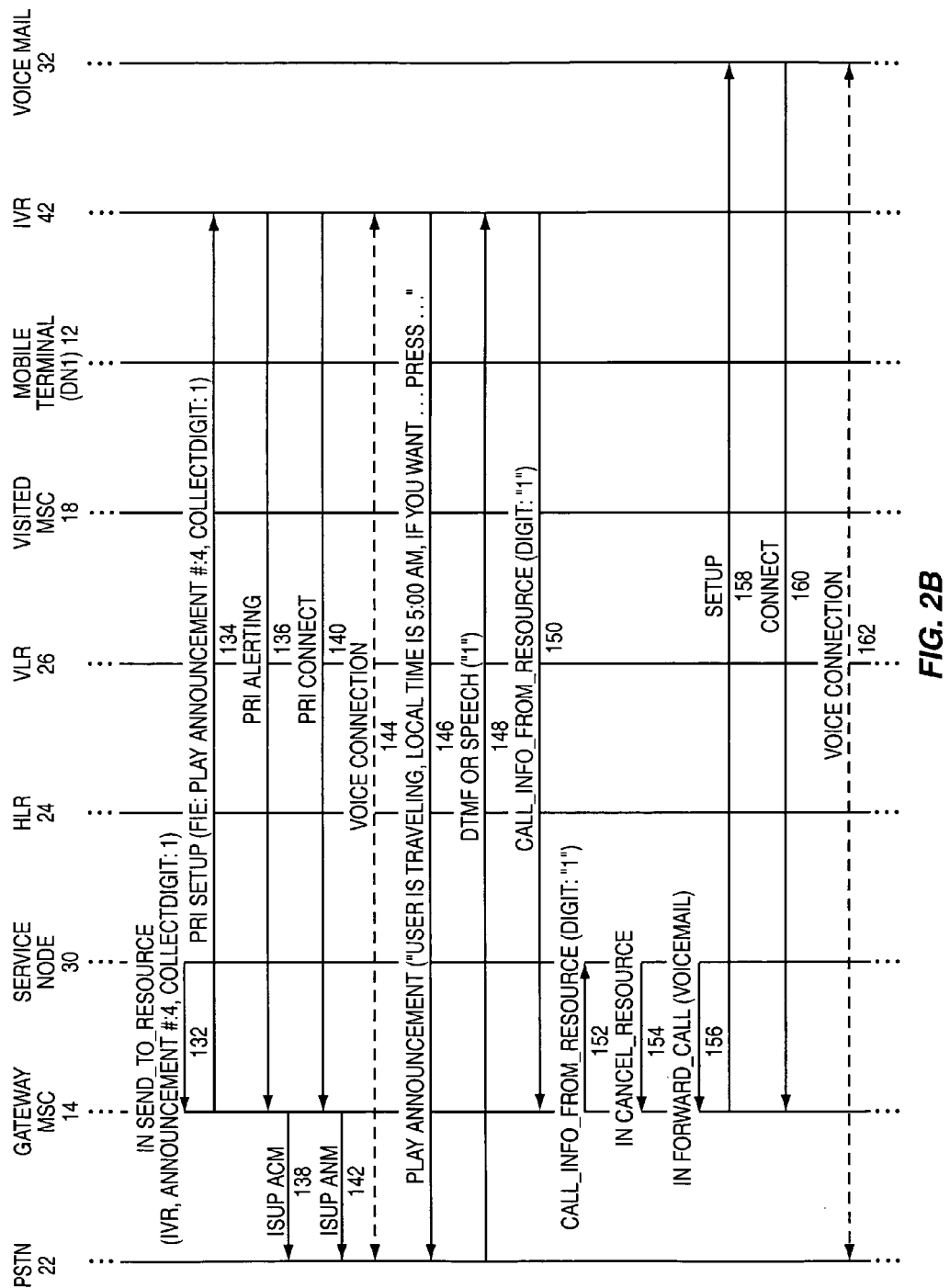

In the exemplary communication flow of FIGS. 2A and 2B, the TDN of a roaming mobile terminal 12 is used to select call processing options for an incoming call to provide to the caller. The caller's response is ultimately used in determining how to process the call. In this embodiment, Code Division Multiple Access (CDMA) call signaling messages are used, but those skilled in the art will recognize that any call signaling format or protocol may be used. Initially, the mobile terminal 12 will move into a service area supported by a visited MSC (V-MSC) 18, and send a Registration message including its mobile identification number (MIN) to the visited MSC 18 via the second network of base stations 20 (step 100). The visited MSC 18 will then send a Registration Notification (REGNOT) message including the MIN to the associated VLR 26 (step 102). The VLR 26 will then send a REGNOT message to the HLR 24 with the MIN (step 104). The HLR 24 will store information indicating that the VLR 26 is the servicing VLR for the mobile terminal 12, and send a REGNOT Response back to the VLR 26 (step 106). The REGNOT Response may include the MIN and any user profile information necessary for providing service to the mobile terminal 12. The VLR 26 will forward the REGNOT Response to the visited MSC 18 (step 108), which will send a Registration Acknowledgement (ACK) to the mobile terminal 12 (step 110). At this point, the mobile terminal 12 is registered with the visited MSC 18, and the HLR 24 is aware of the location of the mobile terminal 12.

Next, assume telephone terminal 34 associated with directory number DN0 initiates a call to the mobile terminal 12 using the primary directory number, DN1. As such, an Integrated Services User Part (ISUP) Initial Address Message (IAM) including the directory numbers for the calling and called parties, DN0 and DN1, respectively, is received at the gateway MSC (G-MSC) 14 (step 112). The gateway MSC 14 will send a Location Request (LOCREQ) message including directory number DN1 to the HLR 24 (step 114). The HLR 24 will associate directory number DN1 with the MIN of the mobile terminal 12, and send a Route Request (ROUTREQ) message including the MIN to the servicing VLR 26 (step 116). The VLR 26 may send a ROUTREQ message to the visited MSC 18 (step 118), which will provide a TDN in association with the MIN of the mobile terminal 12. The visited MSC 18 will then send a ROUTREQ Response to the VLR 26 including the TDN (step 120). The VLR 26 will forward the ROUTREQ Response to the HLR 24 including the TDN (step 122). At this point, the HLR 24 will send the TDN in a LOCREQ Response to the gateway MSC 14 (step 124). Upon receipt of the TDN, the gateway MSC 14 will interact with the service node 30 to receive instructions on how to process the incoming call. In particular, the gateway MSC 14 may send an Intelligent Network (IN) Information Analyzed message identifying the calling and called parties by their respective directory numbers (DN0 and TDN), as well as the originally intended directory number (DN1) (step 126). The service node 30 will receive this information and select a call processing rule for directory number DN1 (step 128). Based on the selected rule, the service node 30 will determine the available call processing options to provide to the caller in light of the TDN assigned to the mobile terminal 12 (step 130). In the illustrated embodiment, the service node 30 will select one of a number of predefined announcements, which are stored in the IVR 42.

The service node 30 will access a profile associated with the subscriber, preferably using the originally intended directory number, DN1, and based on the TDN and any other criteria required by the rules, determine how to instruct the gateway MSC 14 to process the incoming call. The service node 30 may be able to use the TDN to determine billing information, which may need to meet billing criteria established by the subscriber before determining the options to provide to the caller and how to ultimately process the call. In another scenario, the respective time zones may be taken into consideration to ensure that the subscriber is not interrupted in the middle of the night when traveling abroad. Again, the time zone information may be derived from the TDN by the service node 30.

In this example, assume the service node 30 determines that IVR announcement #4 should be provided to the caller. The IVR announcement will inherently include the selected call processing options to provide to the caller based on the TDN of the roaming mobile terminal 12. As such, the service node 30 may send an IN Send To Resource message, which will instruct the gateway MSC 14 to have the IVR system 42 provide IVR announcement #4 (step 132). The instruction may also include the number of digits to collect from the caller in response to the announcement. In this example, the IVR system 42 will collect one digit as a response, wherein the digit will identify one of the numerous call processing options provided in IVR announcement #4. The gateway MSC 14 will then send a message to the IVR system 42, such as in the form of a Primary Rate Interface (PRI) Setup message, which identifies IVR announcement #4 and the number of digits to collect from the caller (step 134). The IVR system 42 will respond by sending a PRI Alerting message back to the gateway MSC 14 (step 136). The gateway MSC 14 will then forward an ISUP Address Complete Message (ACM) back through the PSTN 22 toward the telephony switch supporting the telephone 34 (step 138). When the IVR system 42 is ready to connect to the incoming call, a PRI Connect message is sent to the gateway MSC 14 (step 140), which will send an ISUP Answer Message (ANM) back through the PSTN 22 toward the telephony switch supporting the telephone 34 (step 142). At this point, a voice connection is established between the telephone 34 and the IVR system 42 (step 144).

The IVR system 42 will audibly play the announcement to the caller (step 146). In this example, assume IVR announcement #4 states that, "The user is traveling, local time is 5:00 AM, if you want to leave a voicemail, press 1. If you would like to be connected with the user, press 2. If you would like to be forwarded to an operator, press 0 . . . " (step 146). The caller may provide a response by speaking the number 1 or pressing the number 1 on the keypad of the telephone 34. In either case, the IVR system 42 will either receive a dual tone multi-frequency (DTMF) tone corresponding to the number 1, or will be able to recognize the caller's speech and determine that the selection is "1" (step 148). The IVR system 42 will then send a Call Information From Resource message back to the gateway MSC 14 indicating that the caller's response was "1," which corresponds to routing the call to the voicemail system 32 (step 150). The gateway MSC 14 will then forward the Call Information From Resource message to the service node 30 (step 152), which will send an IN Cancel Resource message to the gateway MSC 14 to end the session with the IVR system 42 (step 154), and then send an IN Forward Call message to instruct the gateway MSC 14 to forward the incoming call to the voicemail system 32 (step 156). The gateway MSC 14 will then send a Setup message to the voicemail system 32 (step 158), which will respond with a Connect message (step 160), wherein a voice connection is established between the caller and the voicemail system 32 (step 162). At this point, the caller can leave a voicemail message in the voicemail system 32 for the user of the mobile terminal 12.

Figure 2C:
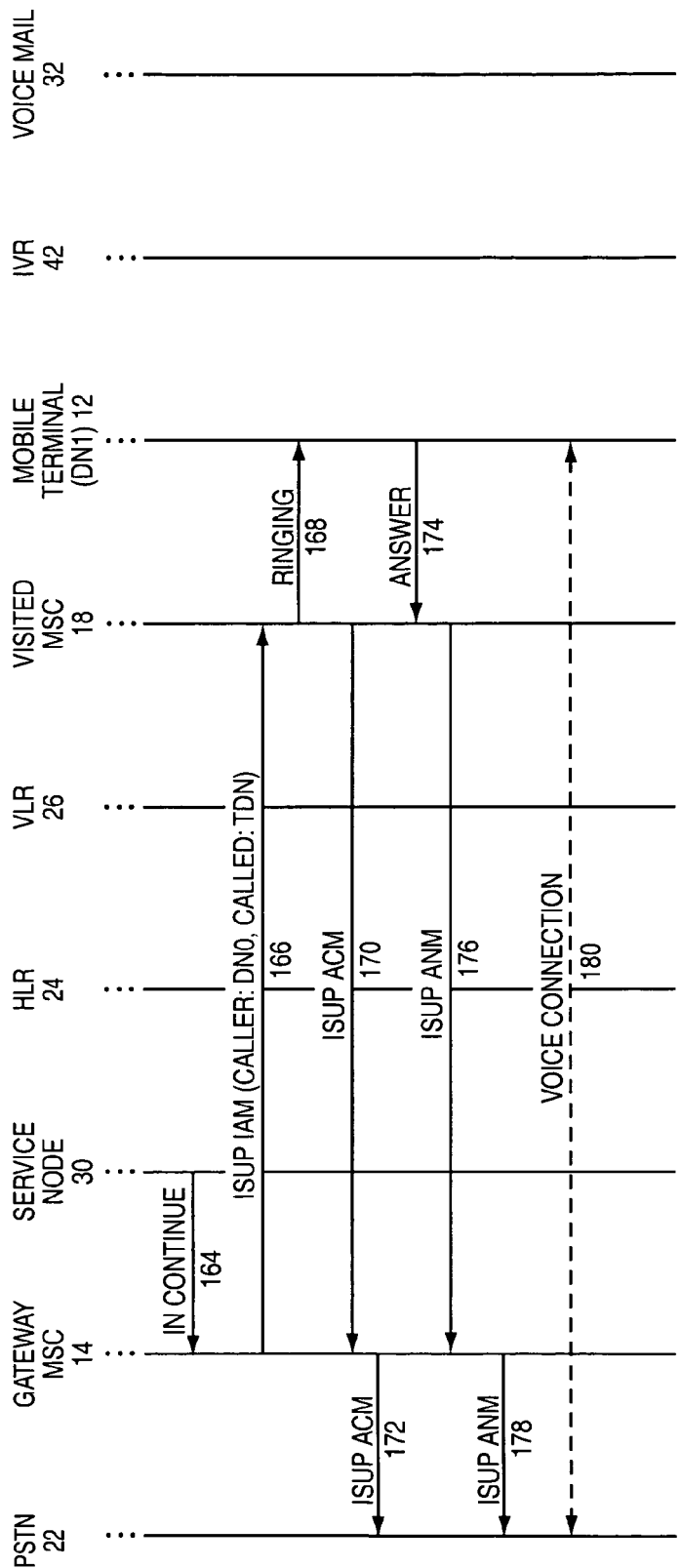
FIG. 2C is a communication flow diagram illustrating the operation of the present invention according to a first alternative embodiment.

Turning now to FIG. 2C, assume that one of the options provided to the caller was to continue with the call, and that the caller selected the option to continue with the call. Once the service node 30 receives the Call Information From Resource message indicating the caller's selection corresponding to routing the call to the mobile terminal 12, the service node 30 would send an IN Continue message to the gateway MSC 14 (step 164) after sending the IN Cancel Resource message (in step 154).

The gateway MSC 14 will send an ISUP IAM including the calling and called directory numbers (DN0 and TDN, respectively) toward the visited MSC 18 (step 166). Upon receipt of the ISUP IAM, the visited MSC 18 will send a Ringing signal to the mobile terminal 12 to alert the mobile terminal 12 of an incoming call (step 168), as well as forward an ISUP Address Complete Message (ACM) back toward the gateway MSC 14 (step 170). The gateway MSC 14 will then send the ISUP ACM through the PSTN 22 in traditional fashion (step 172) to alert the telephony switch supporting the telephone terminal 34 that the call is progressing. When the mobile terminal 12 is answered, an Answer message is received by the visited MSC 18 (step 174), which will forward an ISUP ANM toward the gateway MSC 14 (step 176). The gateway MSC 14 will then forward the ISUP ANM through the PSTN 22 in traditional fashion (step 178). At this point, a voice connection is established between the telephone terminal 34 and the mobile terminal 12 through the gateway MSC 14 and the visited MSC 18 (step 180).

Figure 2D:
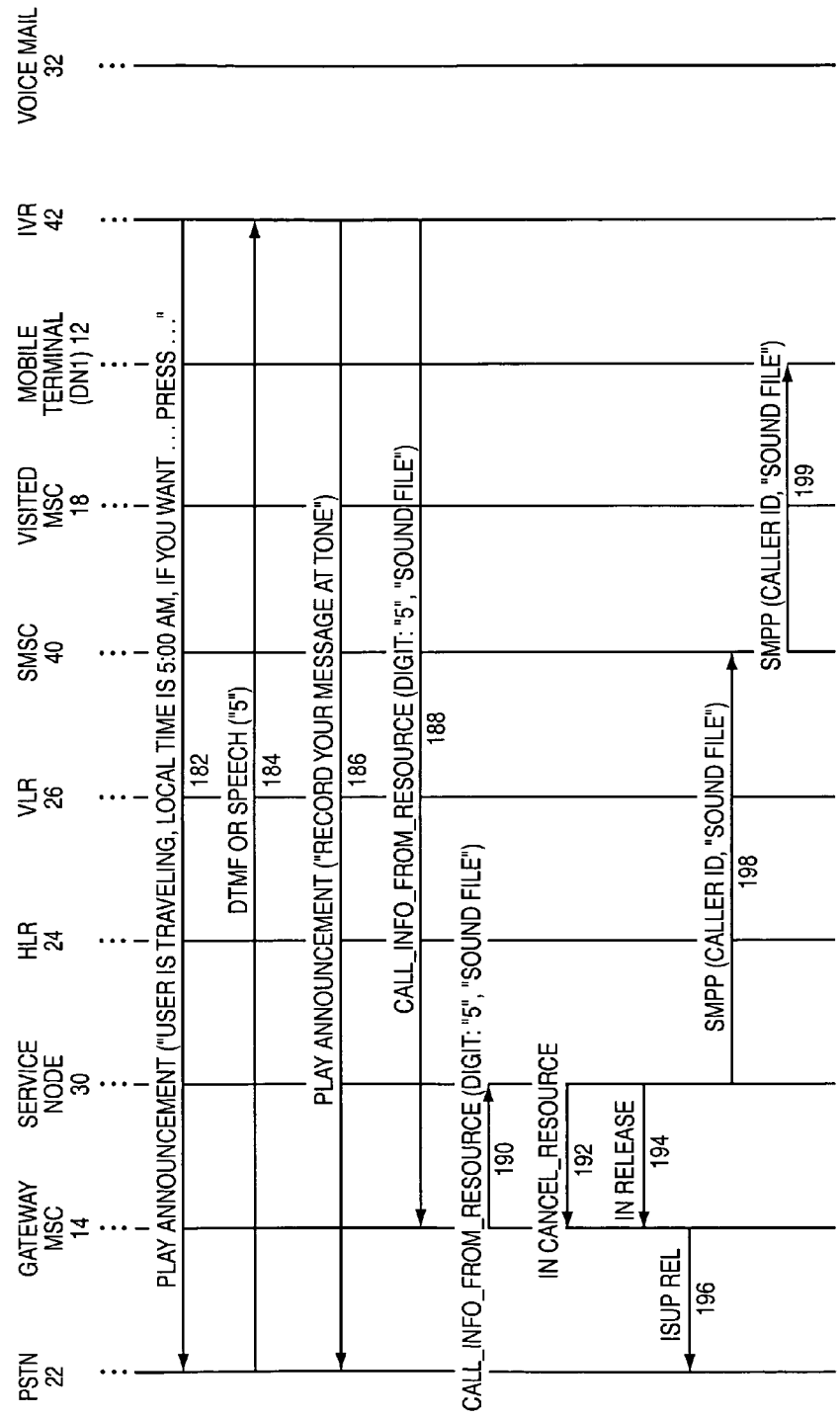
FIG. 2D is a communication flow diagram illustrating the operation of the present invention according to a second alternative embodiment.

With reference to FIG. 2D, yet another option for call processing is illustrated. In this example, the caller is provided an option to record a short message, which will be sent via a Short Messaging Service (SMS) message to the mobile terminal 12. Accordingly, assume that the IVR system 42 is instructed to play an announcement to the caller stating that, "The user is traveling, local time is 5:00 AM, if you want to leave a voicemail, press 1 . . . If you want to leave a short message to be delivered directly to the called party, press 5," (step 182). Assume that the user presses the number 5 on the keypad of the telephone 34 or speaks "five" in response to the message (step 184). The IVR system 42 will recognize the response as corresponding to the option to leave a short message, and will play another announcement, "Record your message at the tone," and will provide a tone (step 186). The caller will leave the short message, and the IVR system 42 will then send a Call Information From Resource message to the gateway MSC 14 indicating that call processing option 5 was selected, and will include the sound file of the caller's message (step 188). The gateway MSC 14 will forward the Call Information From Resource message to the service node 30 (step 190), which will send an IN Cancel Resource message to the gateway MSC 14 to cancel the IVR system session (step 192), as well as send an IN Release message to the gateway MSC 14 to end the incoming call attempt (step 194). The gateway MSC 14 will respond by sending an ISUP Release message back through the PSTN 22 to the telephony switch supporting the telephone 34 (step 196).

The service node 30 may then send a Short Message Peer-to-Peer (SMPP) message including the sound file or the Uniform Resource Locator (URL) for where the sound file is stored and preferably the caller identification (caller ID) associated with the caller to the short message service center 40 (step 198), which will forward the SMPP message to the mobile terminal 12 (step 199). Notably, the message may be sent to the mobile terminal 12 via the visited MSC 18 or through the mobile packet network 38. Further, the short message may be used for call screening, such that the original call is placed on hold until a response from the mobile terminal 12 is received deciding whether to allow the call to continue to the mobile terminal 12 or be routed to voicemail, to another telephone, or the like. The Short Message Service message may come in the form of an audio file attached to the Short Message Service message, or may include text provided by the caller or converted from the speech provided by the caller.

Figure 3:
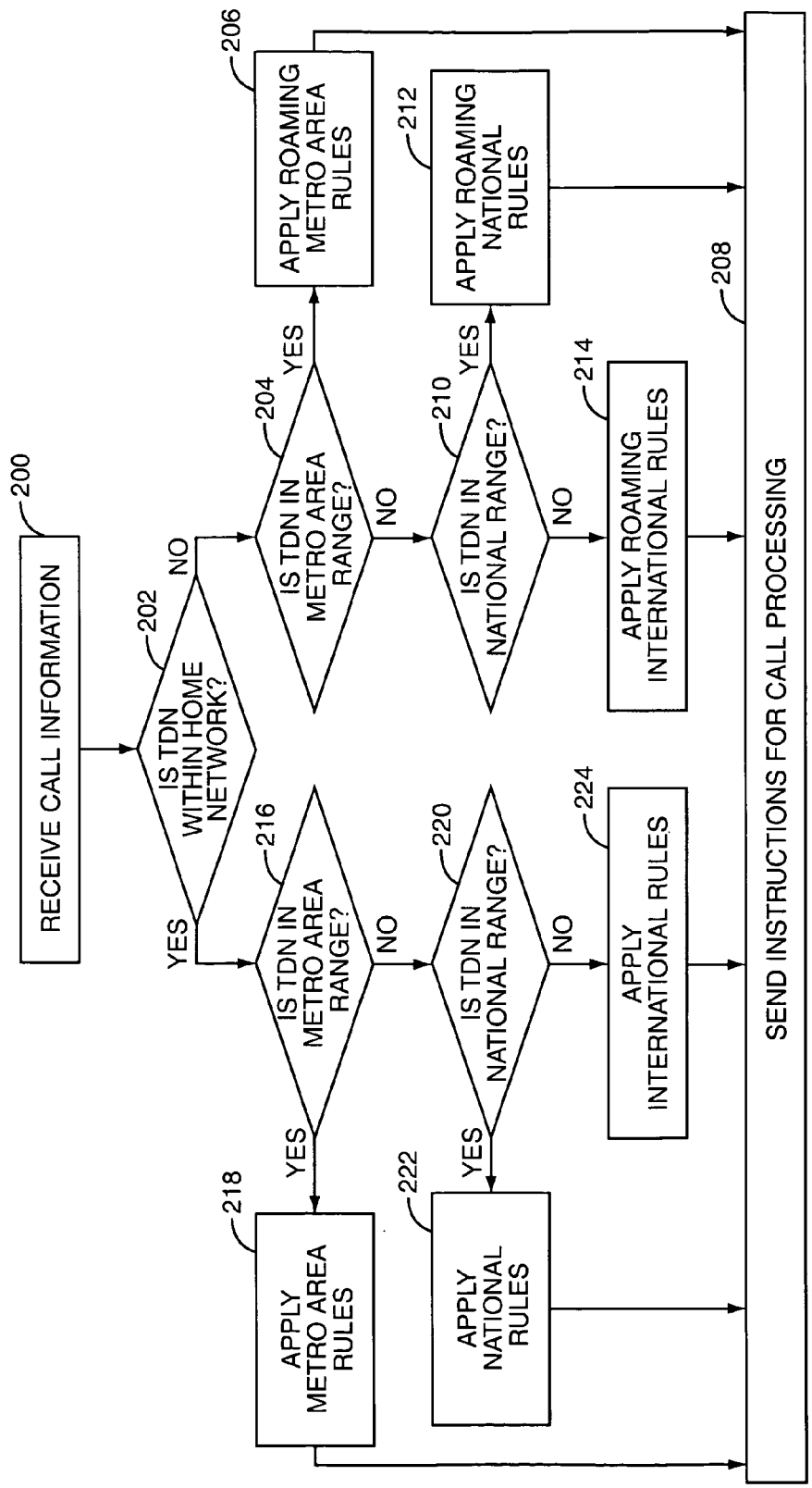
FIG. 3 is a flow diagram illustrating an exemplary call processing scenario according to one embodiment of the present invention.

Turning now to FIG. 3, an exemplary flow diagram is provided illustrating how the TDN may be used to determine how to process the incoming call, and in particular how to select different call processing options to provide to the caller, based on the relative location of the mobile terminal 12. Again, the location is derived from the TDN assigned to the mobile terminal 12. Initially, the service node 30 will receive the call information (step 200) and determine whether the TDN is within the home network of the subscriber's service plan (step 202). The home network is the wireless network to which the mobile terminal 12 subscribes and includes the home switch. Assuming the mobile terminal 12 is outside of its home network, the service node 30 may then determine whether the TDN is associated with a metro area range, which is associated with a smaller geographic area, such as a city (step 204). If the mobile terminal 12 is within the metro area range, the service node 30 will apply roaming metro area rules (step 206), and send instructions for call processing to the gateway MSC 14 (step 208). If the TDN is not in a metro area range (step 204), the service node 30 may then determine whether or not the TDN is within a national range (step 210). If the mobile terminal 12 is within a national range, the service node 30 will apply roaming national rules (step 212), and then send instructions for call processing to the gateway MSC 14 (step 208). If the TDN is not in a national range (step 210), the service node 30 may apply roaming international rules (step 214), and send instructions for call processing to the gateway MSC 14 (step 208).

If the TDN is within its home network (step 202), the service node 30 may still play a role in call processing. For example, the service node 30 may first determine whether the TDN is within a metro area range (step 216). If the TDN is within a metro range, but not roaming, a second set of metro area rules may be applied (step 218), and appropriate instructions are sent to the gateway MSC 14 for call processing (step 208). If the TDN is not within a metro area range (step 216), the service node 30 may determine if the TDN is within a national range (step 220). If within the national range, the service node 30 may apply a second set of national rules (step 222) and send instructions to the gateway MSC 14 for call processing (step 208). If the TDN is not within a national range (step 220), the service node 30 may apply a second set of international rules (step 224) and send instructions to the gateway MSC 14 for call processing (step 208). Thus, the rules applied in steps 218, 222, and 224 are those when the mobile terminal 12 is within its home network but is not served by its home switch, the gateway MSC 14. Those rules applied in steps 206, 212, and 214 are applied when the mobile terminal 12 is outside of its home network. Any of these rules may be further based on the relative billing charges, the caller, the time of day, date, and the like.

Figure 4:
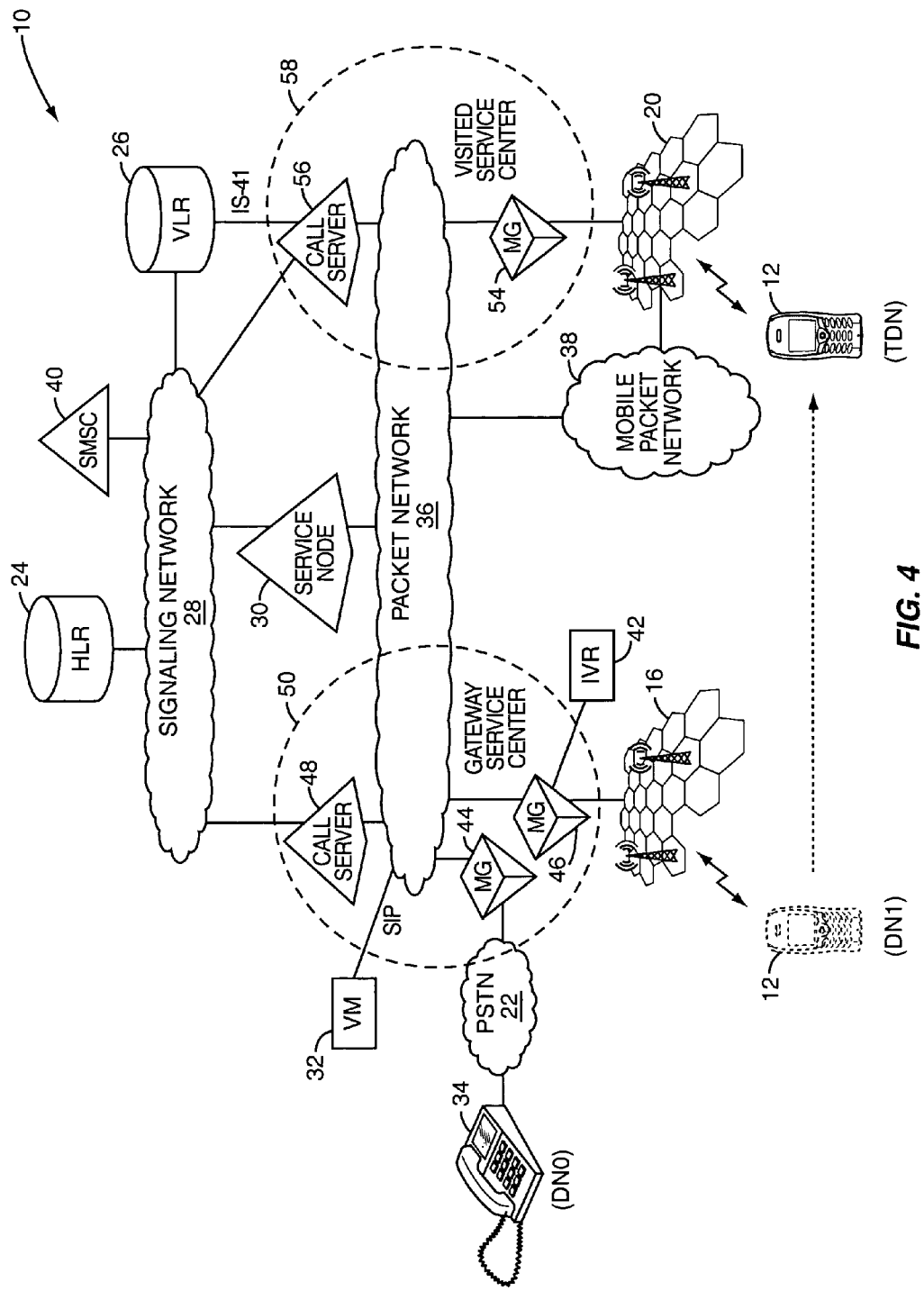
FIG. 4 is a block representation of a communication environment according to a second embodiment of the present invention.

Turning now to FIG. 4, an alternative cellular communication environment 10 is provided, wherein instead of traditional circuit-switched communications, at least a portion of a call to a mobile terminal 12 is facilitated through packet-based communications. As illustrated, first and second media gateways 44 and 46 are associated with a call server 48, which acts as a media gateway controller and cooperates with the media gateways 44 and 46 to facilitate the basic functionality provided by a gateway MSC 14 (FIG. 1). The collection of the first and second media gateways 44 and 46 and the call server 48 is generally referred to as a gateway service center 50, and is used to facilitate communications over a packet network 36. In particular, the first media gateway 44 provides an interface between the PSTN 22 and the packet network 36, wherein the second media gateway 46 provides an interface between the packet network 36 and the first network of base stations 16.

In a similar fashion, a third media gateway 54 and a call server 56 cooperate to provide the basic functionality of the visited MSC 18, and are generally referred to as a visited service center 58. The third media gateway 54 provides an interface between the packet network 36 and the second network of base stations 20, and will cooperate with the call server 56 to allow calls to be established over the packet network 36 and through the third media gateway 54 to the mobile terminal 12 via the second network of base stations 20. As described above, for an incoming call intended for directory number DN1 or any like address associated with the mobile terminal 12, call server 48 will interact with the HLR 24 to obtain the TDN, and then interact with the service node 30 to determine how to process the incoming call. The VLR 26 and call server 48 will cooperate such that the VLR 26 will be able to obtain the TDN for the mobile terminal 12 when being serviced through the visited service center 58. Cooperation between the HLR 24 and the VLR 26 is essentially facilitated as described above.

Figure 5:
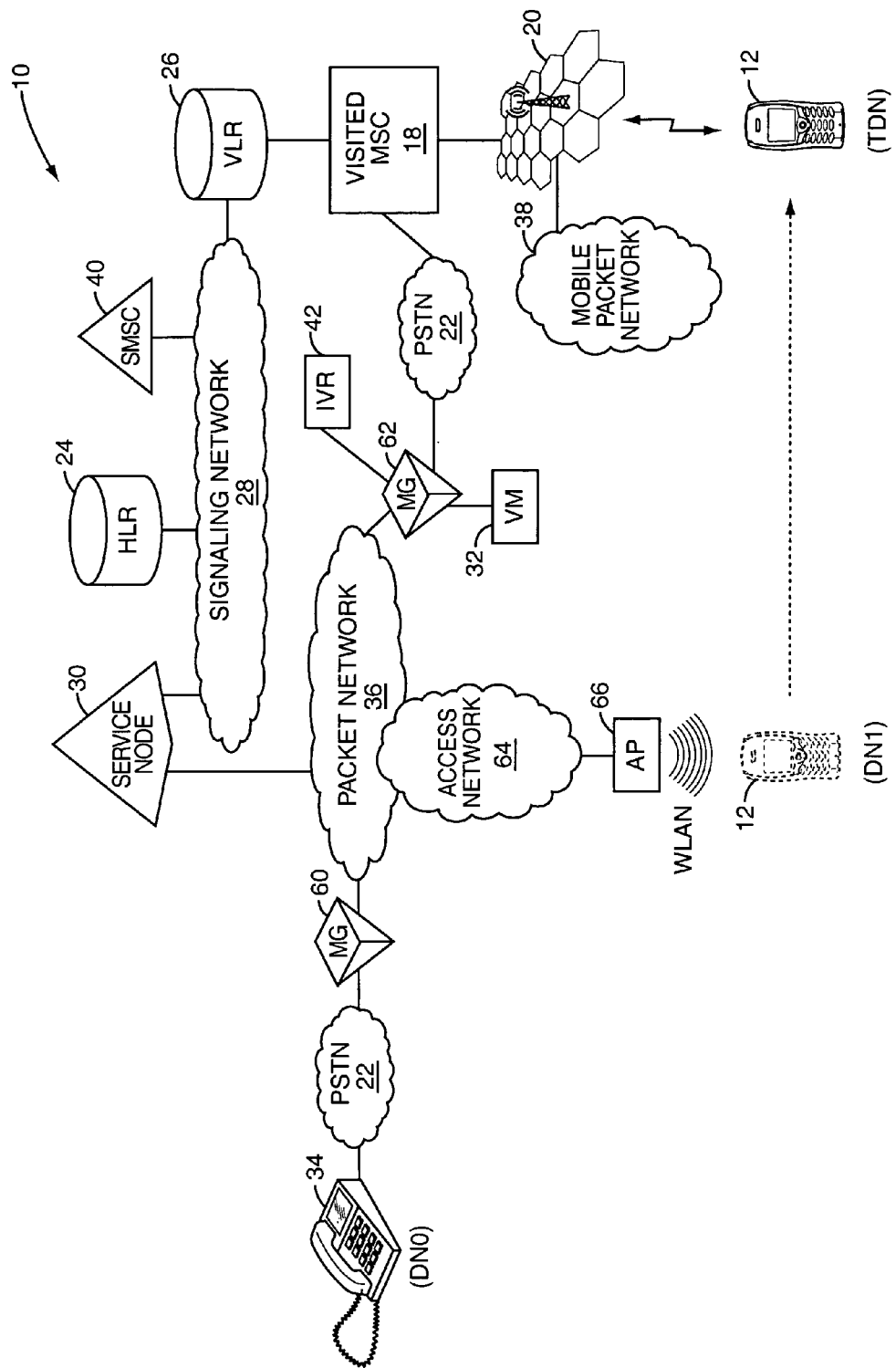
FIG. 5 is a block representation of a communication environment according to a third embodiment of the present invention.
Figure 6:
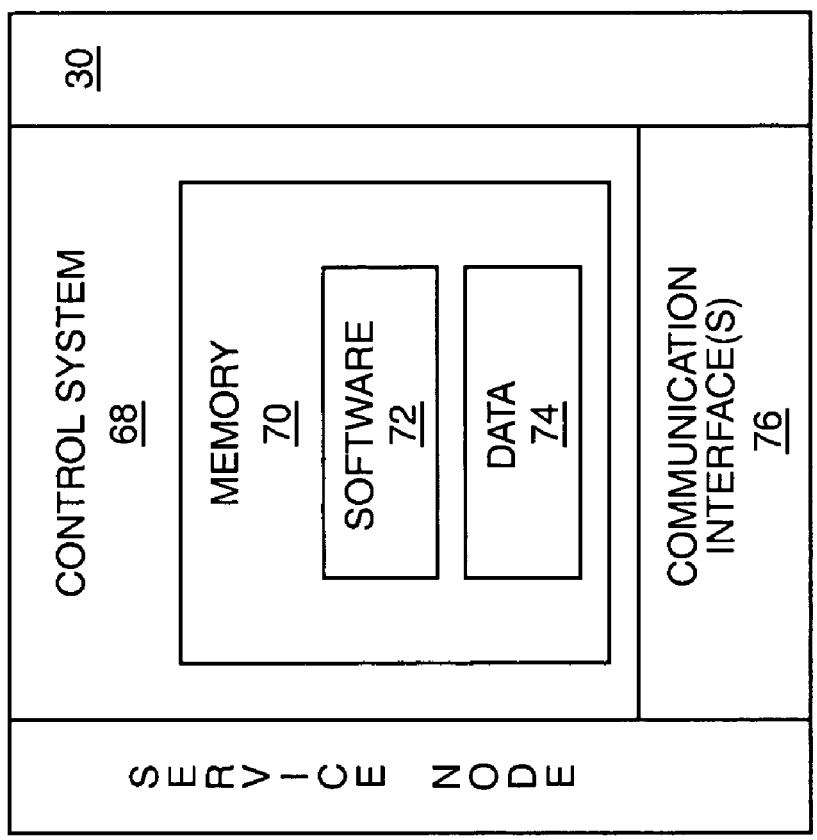
FIG. 6 is a block representation of a service node according to one embodiment of the present invention.

Turning now to FIG. 5, a third alternative cellular communication environment 10 is provided. In this embodiment, a fourth media gateway 60 provides an interface between the PSTN 22, which supports telephone terminal 34, and the packet network 36. A fifth media gateway 62 provides an interface between the packet network 36 and the PSTN 22, which couples to the visited MSC 18. Instead of the mobile terminal 12 being supported via a first network of base stations 16 as provided in FIG. 1, the mobile terminal 12 is supported using local wireless communication techniques, such as those used for wireless local area networks (WLANs). These WLANs may incorporate various 802.11, Bluetooth, and like local wireless communication technologies, wherein wireless communications are provided over a limited range that is generally substantially less than that provided through the cellular networks. A local wireless interface may be provided via an access network 64, which terminates in an access point (AP) 66 that is capable of facilitating local wireless communications with the mobile terminal 12. As such, the mobile terminal 12 is capable of operating in at least two different modes: a first mode in which communications are established using local wireless communication techniques, and a second mode in which communications are established using cellular techniques.

In the illustrated embodiment, communications intended for the mobile terminal 12 via the local wireless interface, such as those facilitated through the access point 66, are associated with the primary directory number DN1. For an incoming call intended for directory number DN1, the fourth media gateway 60 will cooperate with the service node 30 to determine how to route the call. The service node 30 will determine how to instruct the fourth media gateway 60 to route the call based on the TDN received from the HLR 24. As noted above, the TDN is received by the HLR 24 from the VLR 26 when the mobile terminal 12 is roaming outside of the home servicing area.

The terms "call" and "directory number" as used above are used in a generic sense. As such, a call may represent any type of communication session established with the mobile terminal 12, and needs not be a voice session. Further, the term directory number is used for clarity and conciseness, but is intended to include any type of addressing scheme used for addressing, routing calls to, and establishing calls with the mobile terminal 12. The addresses may include numbers, text, or non-alphanumeric characters, and may take the form of a Uniform Resource Locator (URL) or like address.

Turning now to FIG. 7, a block representation of a service node 30 is provided. The service node 30 may include a control system 68 with sufficient memory 70 to store the requisite software 72 and data 74 used to provide the functionality described above. The control system 68 may also be associated with one or more communication interfaces 76 to facilitate communications with the various media gateways, mobile switching centers, call servers, HLRs, and other devices with which communications are necessary.

Those skilled in the art will recognize improvements and modifications to the preferred embodiments of the present invention. All such improvements and modifications are considered within the scope of the concepts disclosed herein and the claims that follow.

What is claimed is:

1. A method comprising:
   a) determining a call from a caller is being initiated to a mobile terminal, which is served by a visited switch;
   b) obtaining a temporary directory number to use for routing the call to the mobile terminal through the visited switch; and
   c) determining information to provide to the caller based on the temporary directory number.

2. The method of claim 1 wherein the information to provide to the caller provides a plurality of call processing options for processing the call.

3. The method of claim 2 further comprising determining a selection of the caller corresponding to one of the plurality of call processing options for processing the call.

4. The method of claim 3 further comprising effecting establishment of a connection to a terminal from which the call was initiated, wherein the selection is received from the caller via the connection.

5. The method of claim 3 further comprising effecting processing of the call based on the selection.

6. The method of claim 5 wherein the call is routed to the mobile terminal in response to the selection.

7. The method of claim 5 wherein the call is routed to a voicemail system associated with the mobile terminal in response to the selection.

8. The method of claim 5 wherein the call is routed to another telephony terminal in response to the selection.

9. The method of claim 1 further comprising effecting delivery of a message to the mobile terminal.

10. The method of claim 9 further comprising receiving call processing instructions from the mobile terminal in response to the message and effecting call processing according to the call processing instructions.

11. The method of claim 10 wherein the message includes a message from the caller.

12. The method of claim 1 further comprising effecting establishment of a connection to a terminal from which the call was initiated and effecting delivery of the information to the caller via the connection.

13. The method of claim 1 wherein the information to provide to the caller provides information bearing on the location of the mobile terminal.

14. The method of claim 1 further comprising providing a profile defining rules for determining the information to provide to the caller based on the temporary directory number.

15. The method of claim 14 wherein the profile is established by a subscriber associated with the mobile terminal.

16. The method of claim 1 wherein the temporary directory number corresponds to charges to be applied to the call, and the information to provide to the caller based on the temporary directory number is determined based on the charges to be applied to the call.

17. The method of claim 1 wherein the temporary directory number corresponds to a relative location of the mobile terminal, and the information to provide to the caller based on the temporary directory number is determined based on the relative location.

18. The method of claim 1 wherein the temporary directory number corresponds to a time zone in which the mobile terminal is located, and the information to provide to the caller based on the temporary directory number is determined based on the time zone.

19. The method of claim 1 wherein the temporary directory number corresponds to a metro area range in which the mobile terminal is located, and the information to provide to the caller based on the temporary directory number is determined based on the metro area range.

20. The method of claim 1 wherein the temporary directory number corresponds to a national range in which the mobile terminal is located, and the information to provide to the caller based on the temporary directory number is determined based on the national range.

21. The method of claim 1 wherein the temporary directory number corresponds to an international range in which the mobile terminal is located, and the information to provide to the caller based on the temporary directory number is determined based on the international range.

22. The method of claim 1 wherein the information to provide to the caller based on the temporary directory number is determined based on the caller initiating the call.

23. The method of claim 1 wherein the information to provide to the caller based on the temporary directory number is determined based on time, date, or a combination thereof.

24. The method of claim 1 wherein the information to provide to the caller based on the temporary directory number is determined based on a time zone in which the mobile terminal is located.

25. The method of claim 1 wherein the temporary directory number is retrieved from a home location register, which retrieves the temporary directory number from a visited location register associated with the visited switch.

26. A system comprising:
   a) at least one communication interface; and
   b) a control system associated with the at least one communication interface and adapted to:
      i) determine a call from a caller is being initiated to a mobile terminal, which is served by a visited switch;
      ii) obtain a temporary directory number to use for routing the call to the mobile terminal through the visited switch; and
      iii) determine information to provide to the caller based on the temporary directory number.

27. The system of claim 26 wherein the information to provide to the caller provides a plurality of call processing options for processing the call.

28. The system of claim 27 wherein the control system is further adapted to determine a selection of the caller corresponding to one of the plurality of call processing options for processing the call.

29. The system of claim 28 wherein the control system is further adapted to effect establishment of a connection to a terminal from which the call was initiated, wherein the selection is received from the caller via the connection.

30. The system of claim 28 wherein the control system is further adapted to effect processing of the call based on the selection.

31. The system of claim 30 wherein the call is routed to the mobile terminal in response to the selection.

32. The system of claim 30 wherein the call is routed to a voicemail system associated with the mobile terminal in response to the selection.

33. The system of claim 30 wherein the call is routed to another telephony terminal in response to the selection.

34. The system of claim 26 wherein the control system is further adapted to effect delivery of a message to the mobile terminal.

35. The system of claim 34 wherein the control system is further adapted to receive call processing instructions provided from the mobile terminal in response to the message and effect call processing according to the call processing instructions.

36. The system of claim 35 wherein the message includes a message from the caller.

37. The system of claim 26 wherein the control system is further adapted to effect establishment of a connection to a terminal from which the call was initiated and effect delivery of the information to the caller via the connection.

38. The system of claim 26 wherein the information to provide to the caller provides information bearing on a location of the mobile terminal.

39. The system of claim 26 wherein the control system is further adapted to provide a profile defining rules for determining the information to provide to the caller based on the temporary directory number.

40. The system of claim 39 wherein the profile is established by a subscriber associated with the mobile terminal.

41. The system of claim 26 wherein the temporary directory number corresponds to charges to be applied to the call, and the information to provide to the caller based on the temporary directory number is determined based on the charges to be applied to the call.

42. The system of claim 26 wherein the temporary directory number corresponds to a location of the mobile terminal, and the information to provide to the caller based on the temporary directory number is determined based on the relative location.

43. The system of claim 26 wherein the temporary directory number corresponds to a time zone in which the mobile terminal is located, and the information to provide to the caller based on the temporary directory number is determined based on the time zone.

44. The system of claim 26 wherein the temporary directory number corresponds to a metro area range in which the mobile terminal is located, and the information to provide to the caller based on the temporary directory number is determined based on the metro area range.

45. The system of claim 26 wherein the temporary directory number corresponds to a national range in which the mobile terminal is located, and the information to provide to the caller based on the temporary directory number is determined based on the national range.

46. The system of claim 26 wherein the temporary directory number corresponds to an international range in which the mobile terminal is located, and the information to provide to the caller based on the temporary directory number is determined based on the international range.

47. The system of claim 26 wherein the information to provide to the caller based on the temporary directory number is determined based on the caller initiating the call.

48. The system of claim 26 wherein the information to provide to the caller based on the temporary directory number is determined based on time, date, or a combination thereof.

49. The system of claim 26 wherein the information to provide to the caller based on the temporary directory number is determined based on a time zone in which the mobile terminal is located.

50. The system of claim 26 wherein the temporary directory number is retrieved from a home location register, which retrieves the temporary directory number from a visited location register associated with the visited switch.

* * * * *